Oct. 23, 1956     J. O. TURKINGTON     2,767,544
ASPARAGUS HARVESTING MACHINE
Filed Nov. 22, 1954     4 Sheets-Sheet 1
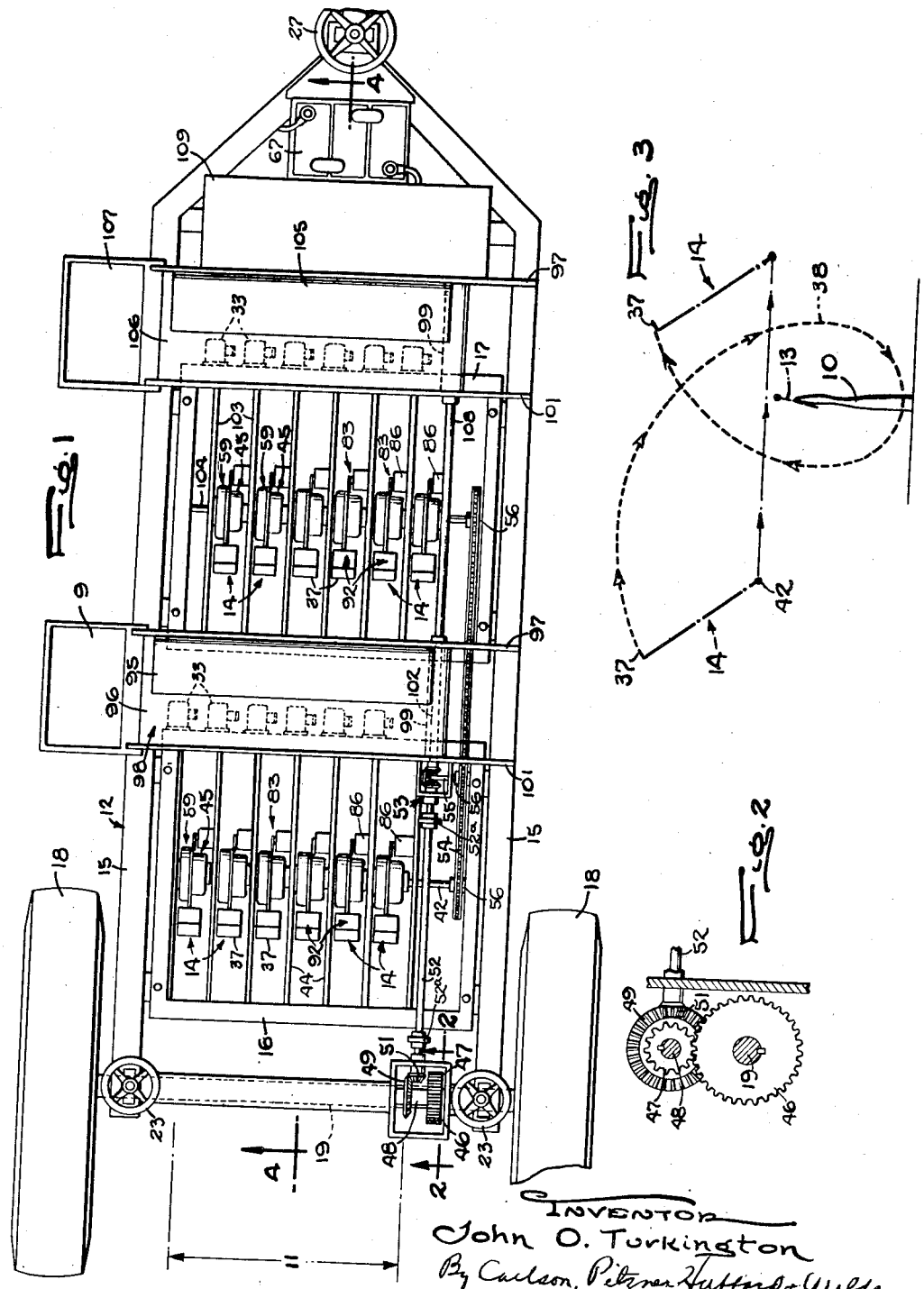
INVENTOR
John O. Turkington
By Carlson, Pitzner Hutton & Wolfe
ATTORNEY Oct. 23, 1956   J. O. TURKINGTON   2,767,544
ASPARAGUS HARVESTING MACHINE
Filed Nov. 22, 1954   4 Sheets-Sheet 2
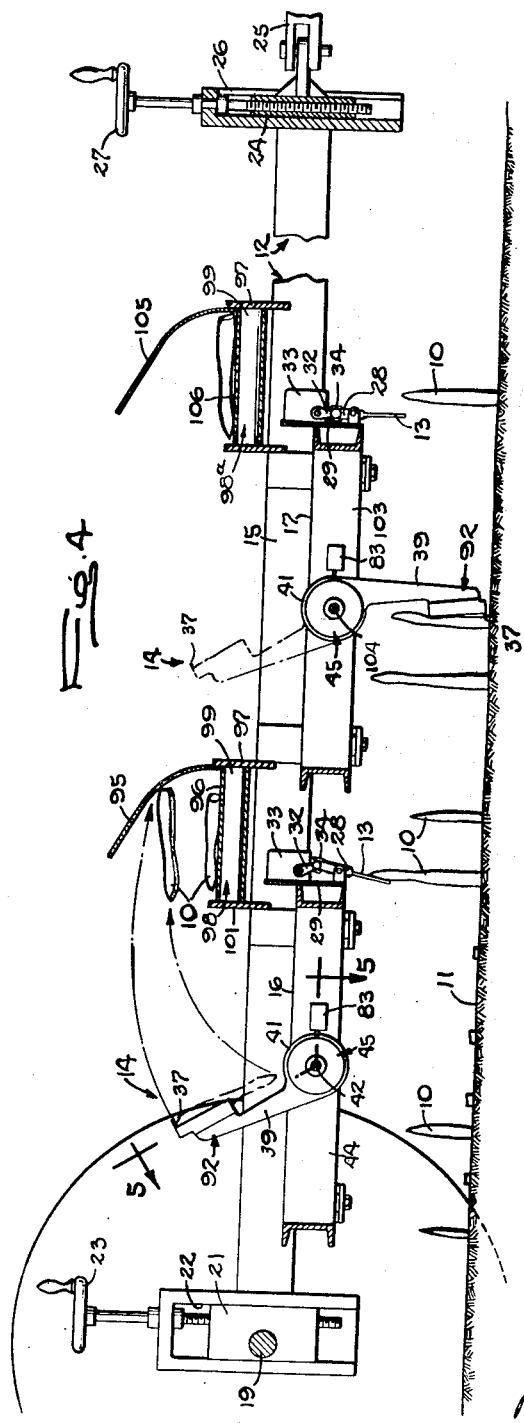
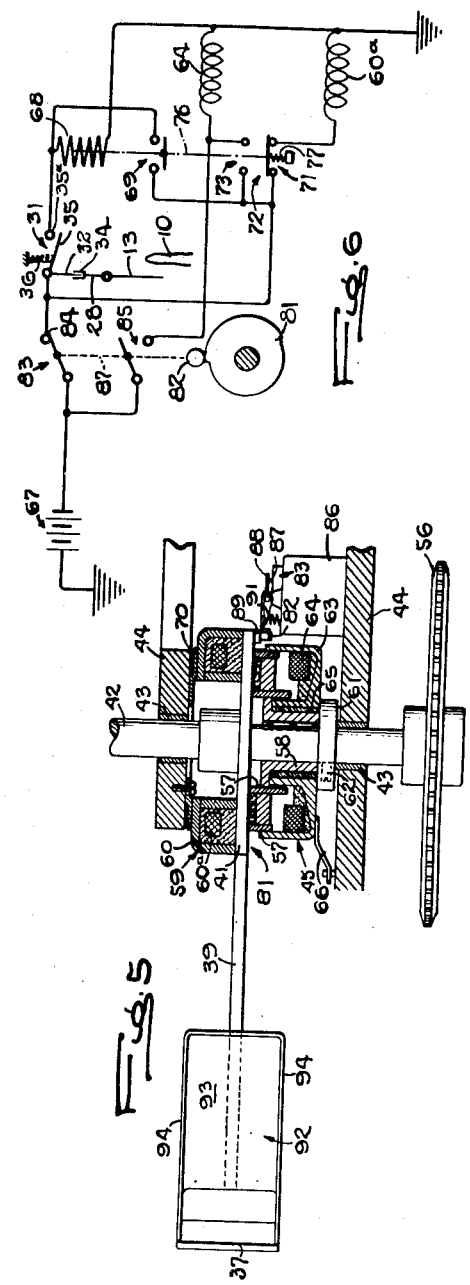
INVENTOR
John O. Turkington
ATTORNEY

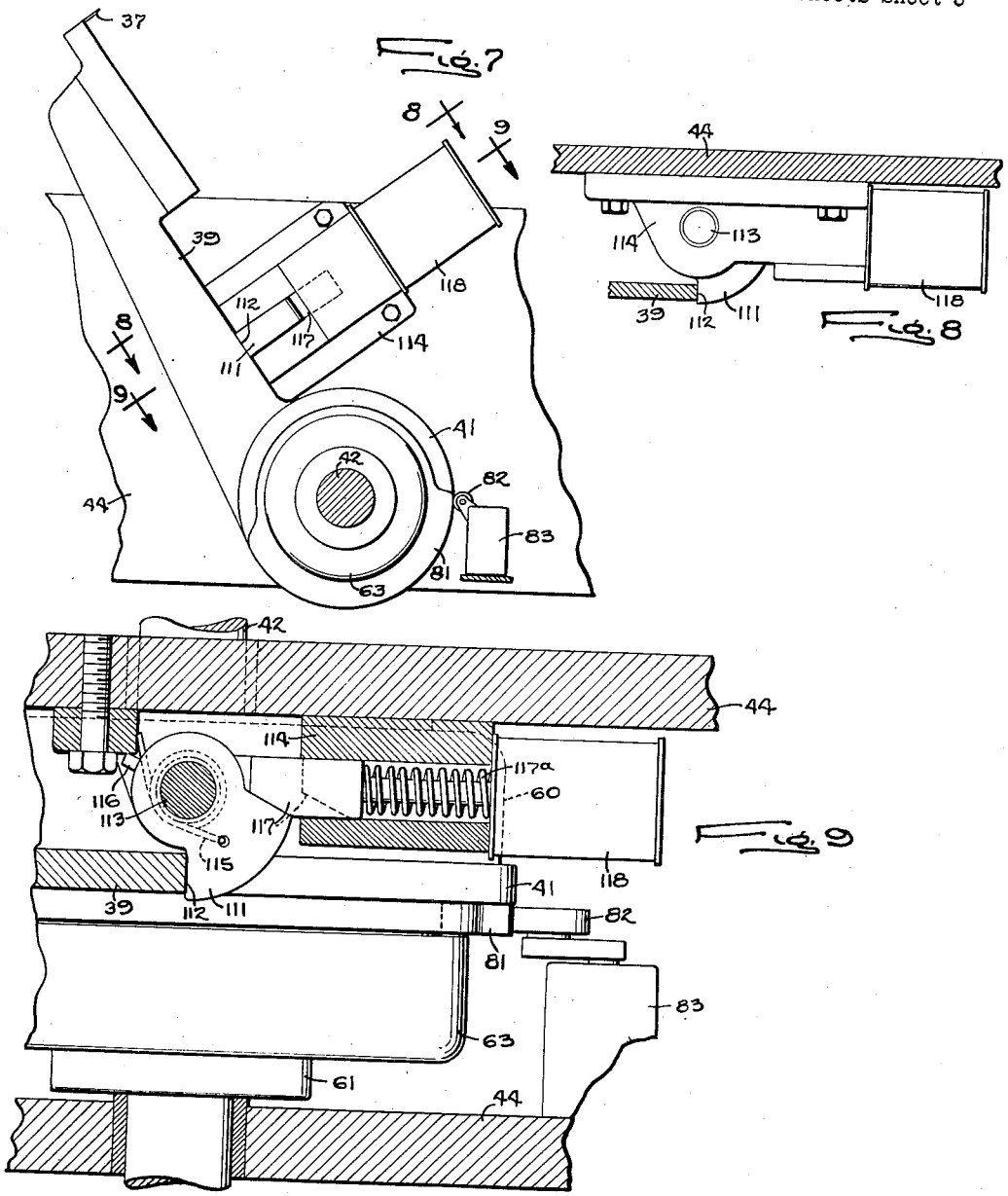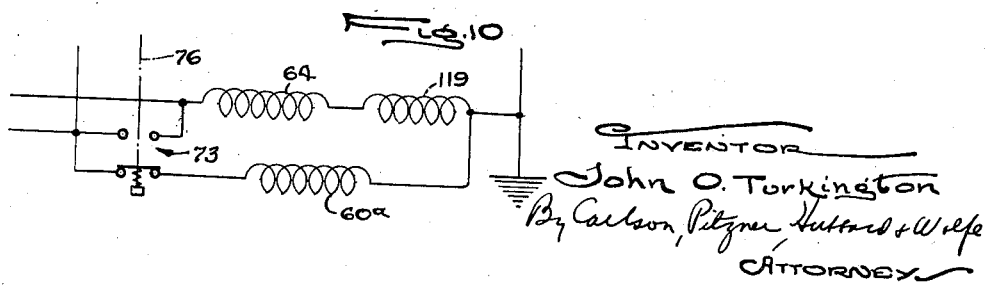

Oct. 23, 1956 J. O. TURKINGTON 2,767,544
ASPARAGUS HARVESTING MACHINE
Filed Nov. 22, 1954 4 Sheets-Sheet 4
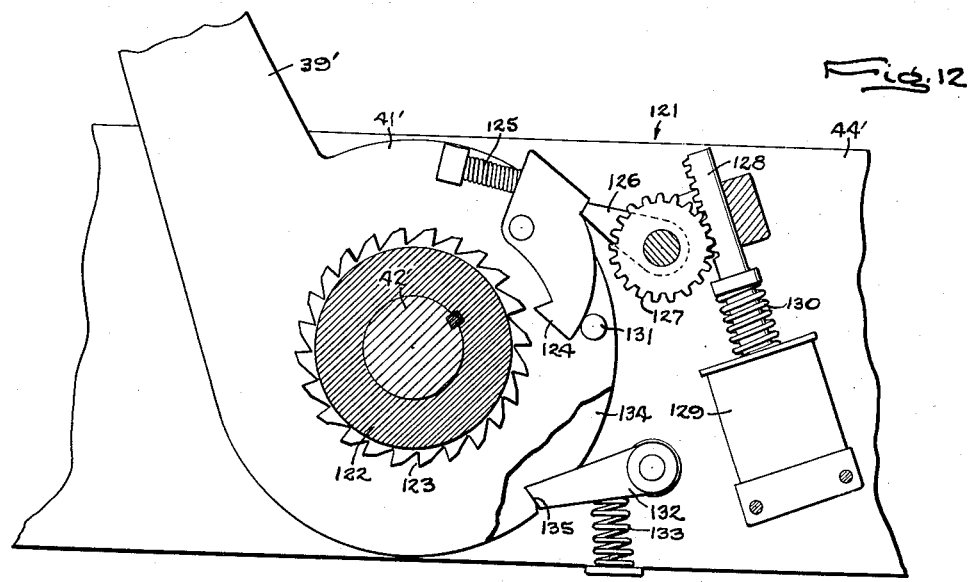
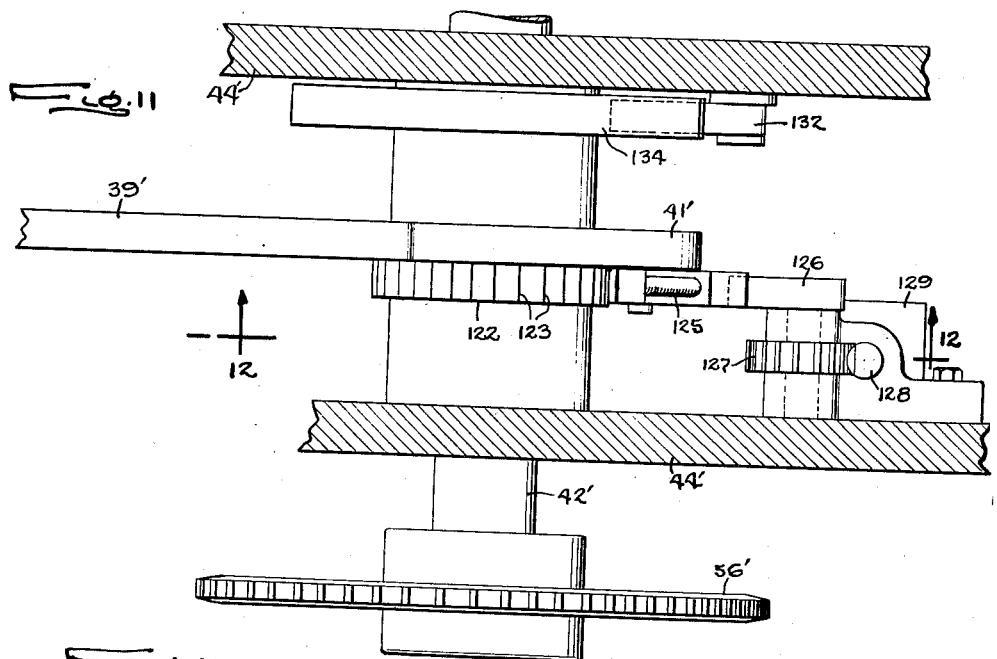
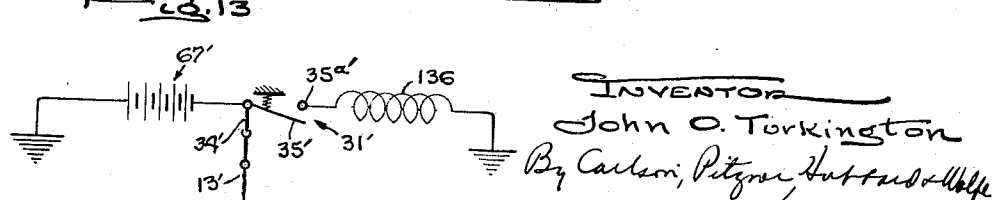
INVENTOR
John O. Turkington
By Carlson, Pitzner, Hubbard & Wolfe
ATTORNEY

United States Patent Office 2,767,544
Patented Oct. 23, 1956

2,767,544

ASPARAGUS HARVESTING MACHINE

John O. Turkington, Rochelle, Ill.

Application November 22, 1954, Serial No. 470,325

15 Claims. (Cl. 56—327)

This invention relates generally to harvesting machines and, more particularly, to machines for harvesting crops such as asparagus planted in flat parallel beds or rows of predetermined width and growing in the form of vertical stalks of varying heights scatered through each bed.

The primary object of the invention is to provide a machine for harvesting plants of the above character which is constructed in a novel manner to select only mature stalks of a predetermined height growing in a flat bed, cut off the selected stalks individually without disturbing adjacent shorter stalks, and retain control of each stalk after it is cut and during its delivery to a collecting point on the machine as the latter is advanced along a plant bed.

Another object is to cut off each selected stalk and propel the same toward the collecting point in one continuous unidirectional movement of a cutter and its support from an inactive position to a discharge position both above the tops of mature stalks and through a cutting position adjacent the lower end of a stalk.

A further object is to move a cutter in a novel manner relative to the machine frame and the bed to insure cutting of a detected stalk in the path of advance of the frame while avoiding damage of adjacent shorter immature stalks by reducing the time the cutter is below the tops of mature stalks.

Still another object is to provide novel mechanism for holding each of a plurality of cutters releasably in its inactive position and propelling each cutter individually through its cutting position in timed relation to detection of a mature stalk in the machine path ahead of the cutter.

The invention also resides in the novel arrangement of a plurality of cutters and individual feelers therefor to detect and cut off stalks in overlapping swaths extending longitudinally of the machine path thereby insuring cutting off of substantially all mature stalks in the bed.

Other objects and advantages of the invention will become apparent from the following detailed description taken in connection with the accompanying drawings, in which Figure 1 is a fragmentary plan view of a harvesting machine embodying the novel features of the present invention.

Fig. 2 is an enlarged sectional view taken along the line 2—2 of Fig. 1.

Fig. 3 is a schematic view showing a cutter and its motion relative to a detected stalk.

Fig. 4 is a fragmentary sectional view taken along the line 4—4 of Fig. 1 with some of the parts shown in different positions.

Fig. 5 is an enlarged sectional view taken along the line 5—5 of Fig. 4.

Fig. 6 is a schematic wiring diagram of an electrical control circuit for one cutting element.

Fig. 7 is an enlarged fragmentary side elevational view similar to Fig. 4 of a cutting unit with a modified form of releasable holding means for the cutter arm.

Figs. 8 and 9 are sectional views taken along the lines 8—8 and 9—9 respectively of Fig. 7.

Fig. 10 is a fragmentary schematic wiring diagram showing the energizing circuit for the modified stop means of Figs. 7 to 9.

Fig. 11 is an enlarged fragmentary plan view similar to Fig. 1 of a cutter with a modified drive mechanism.

Fig. 12 is a sectional view taken along the line 12—12 of Fig. 11.

Fig. 13 is a schematic wiring diagram of the energizing circuit for the modified driving mechanism of Figs. 11 and 12.

While the machine incorporating the present invention is usable in harvesting various crops, it is especially adapted and will be described herein in connection with the selection and cutting off of mature stalks 10 of asparagus which, in large scale cultivation, are grown in relatively wide beds 11 extending across a field. The stalks of the growing crop rise to different heights and are arranged in an irregular and varying pattern along and across the bed. Hand harvesting of asparagus as practiced heretofore involves the visual selection of the mature stalks as determined largely by their height followed by cutting of these stalks at a point spaced a short distance above the ground.

The present invention contemplates the selection of mature stalks of predetermined heights at all points across the bed, cutting off of the selected stalks individually and delivery of the same to a collection receptacle 9 automatically by drawing along the bed 11 a vehicle having a horizontal wheeled frame 12 supporting the operating parts in proper relation to the stalks of the bed as the frame is drawn along the latter by a tractor or other draft vehicle. Generally stated, the improved machine comprises a plurality of cutter units 14 each having a cutter 37 and a support 39 therefor mounted on the frame for movement of the cutter in a circular path relative to the frame from an inactive position above the tops of mature stalks in the bed as shown at the left in Fig. 4 first downwardly and longitudinally of the frame path along the bed to a cutting position adjacent the lower end of a stalk and above the ground and then upwardly to a stalk discharge position which, in this instance, coincides with the inactive position. To retain control of each cut stalk and advance the same toward the receptacle 9, each cutter moves unidirectionally around its path and through the cutting position to its inactive or discharge position, a holder 92 on the cutter support 39 opening forwardly of the cutter path to receive the cut stalk and carry the same to the inactive position. Releasable means 59 holds each cutter poised in its inactive position and stops the same abruptly in such position whereby a cut-off stalk in the holder is thrown forwardly away from the holder. Movement of each cutter around its path is effected by power actuated mechanism under the control of an associated one of a plurality of feeler or sensing devices 13 each operable, during advance of the frame along its path, to detect the presence of a mature stalk ahead of the cutting position of the associated cutter, the power mechanism operating in timed relation to advance of the frame and the detection of a stalk by a feeler to propel the associated cutter through its cutting position when the detected stalk is in the same position.

In this instance, the frame 12 is formed of channel bars and comprises an elongated generally U-shaped outer member 15 wider than the asparagus bed 11 and two rectangular inner members 16 and 17 also wider than the bed and disposed within and secured to the laterally spaced legs of the outer member. Two wheels 18 supporting the rear end of the frame are axially spaced apart to straddle the bed and are fast on opposite ends of a horizontal axle 19. The latter is journaled in axially spaced blocks 21 which are slidable vertically in guides 22 (Fig. 4) rigid with the ends of the legs of the U-shaped outer frame member 15 and are moved relative to the latter by turning hand wheels 23 to vary the height of the rear end of the frame relative to the axle and therefore, the height of the operating parts above the bed. A similar block 24 adapted to be connected to the draw bar 25 of a tractor for supporting the front end of the frame is slidable in a guide 26 on the outer frame member and is moved relative to the latter by turning a third hand wheel 27.

Selection and cut-off of mature stalks 10 at all points across the bed 11 as the machine advances along the latter is insured by arranging the feelers 13 and cutter units 14 in two rows spaced across and extending longitudinally of the frame 12 with the swath covered by each feeler and its associated cutter of one row extending longitudinally of the frame and intervening between and overlapping adjacent swaths of the cutters and feelers of the other row to cover the entire width of the bed. Each cutter support 39 is an elongated arm carrying its cutter 37 at its outer end and journaled at its other end on the frame for rotation of the cutter in a vertical plane extending parallel to the direction of movement of the frame and through the associated feeler 13 which is disposed ahead of the cutter on the frame. The rotary mounting of the several cutters preferably is simplified by journaling the arms on two parallel horizontal shafts 42 and 104 respectively supporting the cutters of the two rows and themselves journaled in bearings 43 (Fig. 5) carried by laterally spaced parallel frame plates 44 and 103. The latter respectively are secured to and form parts of the inner frame members 16 and 17 and extend longitudinally of the frame in between adjacent cutter units of the two rows. In this instance, each cutter 37 is a blade secured to the outer end of its supporting arm and extending transversely of the latter and the frame.

The individual power actuated means provided for propelling the cutters 37 from their inactive positions and through their cutting positions may take various forms. In the preferred form shown in Figs. 1 to 6, this means includes the shafts 42 and 104 which are rotated continuously during advance of the frame 12 and individual electromagnetic friction clutches 45 which are energizable selectively to couple the associated cutter to its supporting shaft. To insure synchronism of the movement of each cutter with the rate of forward advance of the machine, the shafts are coupled directly to the wheels 18 by a speed increasing connection. This connection between the axle and the shafts 42 and 104 includes a large spur gear 46 (Fig. 2) fast on the axle 19 and meshing with a smaller gear 47 fast on a shaft 48 parallel to the axle and carrying a large bevel gear 49. The latter meshes with a similar smaller gear 51 fast on one end of a longitudinal shaft 52 connected through two universal joints 52ª to gears in a box 53 on the rear inner frame member 16. A shaft 55 projecting from the gear box 53 in parallelism with the cutter shafts 42 and 104 and driven through the gears in the box 53 is connected to the cutter shafts by a chain 54 and sprockets 56 fast on the three shafts.

To reduce the length of time each cutter 37 is below the tops of mature stalks 10 in the bed 11, the direction of rotation of the shafts 42 and 104 and therefor of the cutters preferably is the same as that of the wheels 18. With the cutter moving in this direction, its movement through the cutting position is reverse to the direction of movement of the frame and the cutter path relative to the bed 11, being the combination of circular movement relative to the frame and rectilinear movement along the bed, is a loop which is narrow horizontally and elongated vertically as indicated at 38 in Fig. 3.

Each of the electromagnetic friction clutches 45 is of the type having rotatable annular pole pieces 57 terminating in axially facing pole faces adapted for frictional gripping engagement with one side of a disk 41 of magnetic material which is secured to the inner end of the associated cutter arm 39 and constitutes the armature for the clutch. The pole pieces are carried by a radial flange of a sleeve 58 which is keyed to the supporting one of the shafts 42 and 104 and is held against axial movement away from the armature disk by a collar 61 secured to the shaft by a set screw 62. Flux for drawing the disk into engagement with the pole faces is produced by a stationary magnet having a hollow annular core 63 of U-shaped cross section enclosing an annular multiple turn winding 64 and journaled on a bearing 65 carried by the sleeve, the core being secured to one of the longitudinal frame bars 44 by a bracket 66 and thereby held against rotation with the shaft. Annular pole pieces of the core straddle and overlap axially the rotatable pole pieces 57 to complete the flux path for the magnet. To compensate for wear on the pole faces, the collar 61 may be shifted axially toward the armature disk after loosening the set screw 62.

In the preferred construction of Figs. 1 to 6, the releasable means 59 for stopping and holding each cutter arm 37 in its inactive position comprises an electromagnetic friction brake. An annular core 60 of the latter encloses a multiple turn winding 60ª and has radially spaced pole pieces terminating in pole faces adapted for axial gripping engagement with the side of the armature disk 41 opposite the clutch 45. A plate 70 welded to the back of the core is bolted to the adjacent one of the frame bars 44 and 104 to hold the brake magnet stationary with respect to the frame 12.

Control of the clutch 45 and brake 59 of each cutter unit 14 is effected jointly in response to detection of a stalk by the associated feeler 13 and to the angular position of the cutter arm 39. While the feelers may take various forms, each is shown herein as comprising the lower end of a vertically disposed lever 28 which is widened transversely of the frame a distance corresponding to the length of its cutter 39 and terminates at a point spaced above the ground a distance equal to the height of stalks to be selected. The lever is fulcrumed intermediate its ends on a plate 29 rigid with the frame 12 for swinging about a horizontal axis extending transversely of the frame. Movement of the feeler upon engagement with the top of a mature stalk is utilized to close a normally open switch 31 (Fig. 6) which is enclosed in a casing 33 secured to the plate 29 and includes a pivoted actuator 32. The latter depends from the casing and into the forked upper end 34 of the lever for swinging of a contact 35 on the actuator 32 into engagement with a fixed contact 35ª when the feeler is moved rearwardly, as shown in Fig. 3 and at the left in Fig. 4, upon engagement with a stalk. A spring 36 acting on the movable contact 35 yieldably urges the latter to its open position and the feeler to its vertical position.

The angular position of each cutter arm 39 relative to the frame is detected by a switch 83 enclosed in a casing mounted on a block 86 rigid with an adjacent one of the frame bars 44 and 103. An actuator pin 87 for the switch projects from the casing for engagement with one end of a lever 88 pivoted intermediate its ends on the block 86 and carrying a follower roller 82 at its other end. The follower roller rolls along the outer periphery of the axially facing clutch side of the cutter disk 41 which projects radially beyond the outer periphery of the clutch core 63 and constitutes an open face cam 81. The latter includes an axially projecting dwell portion 89 which extends around the periphery of the cam and, when acting on the follower roller 82, shifts the lever 87 to close normally open contacts 84 and open normally closed contacts 85 of the switch, a spring 91 acting between the block and the lever to urge the latter to a position in which the contacts 85 are closed and the contacts 84 are open as occurs when the follower 82 rolls off of the dwell rise 89.

When each cutter arm 39 is in its inactive position, the clutch winding 64 is deenergized and the follower 82 engages the dwell 89 and the contacts 84 of the cutter arm switch 83 are closed to complete an energizing circuit for the brake winding 60a through a source 67 of direct current (see Fig. 6) and normally closed contacts 71 of a relay 68 and the clutch. Herein, the same source 67 supplies direct current for all of the electrically actuated parts, the relays for the individual cutter units being housed in a control box 109 mounted on the front of the frame along with the source.

As soon as the feeler switch 31 closes, a circuit is completed through the source 67 and the contacts 84 to energize the relay 68 thereby opening the contacts 72 in the brake circuit and closing normally open contacts 73 to complete an energizing circuit for the clutch winding 64 through the source and the cam switch contacts 84. A holding circuit for the relay coil also is completed to the source through normally open relay contacts 69 and the cam switch contacts 84.

With the clutch 45 energized and the brake 59 deenergized, the cutter arm 39 is coupled to the associated one of the drive shafts 44 and 104 to propel the cutter 37 downwardly through the cutting position. Once such rotation begins, the follower roller 82 leaves the dwell 89 on the cam 81 and the cam switch contacts 84 open to interrupt the holding circuit for the relay while the contacts 85 close to complete a second circuit to the clutch winding 64 to maintain the latter energized. The relay switch 71 in the brake circuit thus is closed to condition the brake circuit for completion by the cam switch contacts 84 and the other relay switches 69 and 73 are opened, a spring 77 acting on the relay armature 76 to urge the latter to its inactive position in which the brake switch 71 is closed. As the cutter arm 39 continues to rotate, the dwell 89 engages the follower roller again to open the cam switch contacts 85 in the clutch circuit and to close the contacts 84 to complete the circuit for reenergizing the brake winding 60a and stop the cutter arm abruptly in its inactive position.

It has been found that electromagnetic friction couplings of the type disclosed herein are characterized by a short time delay between energization of the winding for the device and the transmittal of torque thereby. For this reason, the cam dwell 89 extends a substantial distance around the cam 81, herein aproximately 180 degrees, as shown in Fig. 6, to complete the brake circuit before the cutter arm reaches its inactive position. Such time delay is also taken into account in correlating the cutter movement with the rate of vehicle advance to insure that the cutter moves through its cutting position at the same time that a stalk detected by the associated feeler is in this same position relative to the frame.

To retain control of a cut-off stalk during movement of each cutter arm 39 beyond its cutting position and to its inactive position, each holder 92 is of channel shape and comprises a flat bottom wall 93 secured to the leading edge of the arm and upstanding side walls 94 which project forwardly from the bottom wall in radial planes to prevent stalks from rolling laterally out of the holder. The bottom wall is spaced behind the leading edge of the cutter 37 which, in this instance, is secured to the outer ends of the side walls projecting beyond the bottom wall and constitutes a bottom stop engageable with the base of a cut-off stalk to prevent the same from moving endwise and outwardly from between the side walls by centrifugal force as the arm rotates.

The stopping motion of each cutter arm 39 in its inactive position is utilized to remove a cut-off stalk from the holder 92 and deliver the same to an out-of-the-way position which is spaced from the cutter unit and from which the stalk is delivered to the collection rectptacle 9 for the rear row of cutters or a similar receptacle 107 for the front row of cutters. To accomplish this, deflector members or stalk receivers 95 and 105 are positioned forwardly of the rows of cutters and each cutter arm is stopped short of the vertical, herein approximately 30 degrees, so that the stalk is thrown forwardly and upwardly into engagement with the associated deflector member. The deflector members intercept the thrown stalks and direct the same onto associated horizontal collecting surfaces 96 and 106 spaced forwardly beyond the rows of cutter units 14 and the paths of the blades 37 thereof.

In this instant, the deflectors 95 and 105 are curved plates which are secured at their lower ends to cross bars 97 extending along the forward edges of the collecting surfaces 96 and 106 and spanning and rigid with the legs of the outer U-shaped frame member 15. From its cross bar, each deflector projects upwardly higher than the inactive positions of the holders 92 of the associated row of cutter units 14 and rearwardly across the collecting surface and toward the holders as shown in Fig. 4. Due to the fact that the base of each stalk is heavier than its tip, a stalk thrown forwardly and away from the holder tends to turn over from an upside down position in the holder to a generally horizontal position at the time it reaches the deflector. There, the base of the stalk engages and slides downwardly along the deflector until the stalk drops onto the adjacent collecting surface, each stalk extending longitudinally of the frame. To intercept all of the stalks thrown from the holders of one row of cutter units, the associated deflector plate preferably extends the full width of the frame in front of the units.

The collecting surfaces 96 and 106 are upper straight runs of endless conveyor belts 98 and 98a extending parallel to and spaced forwardly of the cutter shafts 42 and 104 and adapted to move transversely of the frame to carry to one side of the latter stalks received from the deflectors. At corresponding ends of the collecting surface, the stalks drop into the collection receptacles 9 and 107 which are open-topped boxes secured to the frame and positioned below the ends of the collecting surfaces. As each stalk drops onto the conveyor and is carried thereby to a receptacle, it remains in its longitudinal position with respect to the frame so that all stalks in each receptacle extend in the same direction to facilitate subsequent handling. In this instance, each conveyor is stretched between two parallel rollers 99 (Fig. 1) journaled in the cross bar 97 supporting the deflector and a parallel bar 101 rigid with the outer frame member 15 and extending along the rear edge of the conveyor. These cross bars project upwardly beyond the collecting surfaces 96 and 106 to hold stalks on the latter as they are advanced toward the collection boxes. To move the rear conveyor continuously during advance of the machine along the bed 11, one of the rollers 99 thereof is fast on a shaft 102 extending into the gear box 53 and connected to one of the gears therein in the driving connection between the cutter shaft 42 and the rear axle 19. An extension 108 of the rear conveyor shaft 102 drives one roller 99 for the front conveyor belt 98a.

To insure accurate positioning of each cutter arm 39 in its inactive position and, therefore, proper timing of movement of the arm through the cutting position in response to detection of a stalk by the associated feeler 13, it is desirable in some cases to provide for each cutter arm a positive blocking member 111 which cooperates with the electromagnetic friction brake 59 to stop the cutter arm and releasably hold the same in its inactive position. This member is movable back and forth between an advanced position of abutment with a leading edge 112 of the cutter arm when the latter is in the inactive position as shown in Figs. 8 and 9 and a retracted position out of the path of the arm, the member moving back and forth in timed relation to detection of a stalk by the feeler 13 of the associated cutter arm 14.

In the present instance, the blocking member 111 is a segment pivoted at 113 on a bracket 114 which is secured to the adjacent one of the longitudinal frame walls 44 and 103 with the pivotal axis of the segment parallel to the cutter arm 39 when the latter is in its inactive position. A torsion spring 115 encircling the pivot 113 is anchored at one end to the segment and acts at its other end against the bracket to urge the segment to its blocking position shown in Figs. 8 and 9, movement of the segment being limited by a stop 116 thereon engageable with the bracket. Movement of the segment out of its blocking position normally is prevented by a solenoid armature 117 which normally is urged outwardly by a spring 117ª to lock the segment as shown in full in Fig. 9 but which is retracted as shown in phantom in Fig. 9 to permit movement of the segment to its retracted position when the solenoid 118 is energized.

Energization of the solenoid 118 to retract its armature 117 in timed relation to detection of a stalk by the feeler 13 of the associated cutter 37 is effected simply by connecting the solenoid coil 119 in series with the clutch winding 64 between the relay switch 73 and ground as shown in Fig. 10. Thus, each time the clutch winding 64 is energized to couple the cutter arm 39 to its drive shaft, the solenoid armature 117 is retracted permitting the cutter arm to shift the segment 111 to its retracted position, the segment shifting back to its advanced position as soon as the cutter arm has passed. Upon deenergization of the clutch winding by opening of the cam switch 85 just before the arm has reached the cutting position, the solenoid 118 is deenergized and its armature shifts outwardly to lock the segment in its advanced position to stop the arm precisely in its inactive position. Instead of facing axially the cam 81 may, as shown in Figs 7 and 9, face radially and outwardly for engagement by the follower roller 82.

Instead of the electromagnetic friction clutch 45 and brake 59 for coupling each cutter arm 39 to the associated one of the drive shafts 42 and 104, the power actuated mechanism for propelling the arm in timed relation to detection of a stalk by its feeler 13 may comprise a positive acting one-revolution mechanical clutch and brake unit 121. This unit is shown in Figs. 11 and 12 in which parts corresponding to the preferred construction bear similar but primed reference characters.

The modified torque unit 121 of Figs. 11 and 12 includes a driving member 122 in the form of a collar having peripheral teeth 123 and fast on the drive shaft 42' adjacent the disk 41' on the inner end of the cutter arm 39'. Cooperating with the driving teeth is a pawl 124 which is pivoted on the cutter disk 41' and is yieldably urged by a spring 125 into engagement with the teeth to couple the disk to the shaft 42'. Normally, the pawl is held in a retracted position shown in Fig. 12 by a detent 126 which is pivoted on the adjacent frame member 44' and carries a spur gear 127 meshing with a rack bar 128 constituting the armature of a solenoid 129 secured to the frame member 44'. The rack bar is urged outwardly by a spring 130 to position the detent in the path of the pawl 124 and urge the same against a stop 131 on the cutter arm disk 41'. Retraction of the rack bar by energization of its solenoid permits the pawl to engage the driving teeth. To avoid rebound of the cutter arm and hold the same in its inactive position against reverse rotation, a dog 132 pivoted on the frame member 44' is yieldably urged by a spring 133 against the periphery of a circular plate 134 secured to the disk 41' and into a notch 135 in the plate when the arm is in its inactive position.

To actuate each modified torque unit 121 in timed relation to detection of a stalk by the accociated feeler 13', the feeler switch 31' is connected in series with the source 67' and the coil 136 of the solenoid 129 for energization of the latter when the switch is closed. As soon as the feeler switch closes, the solenoid is energized to retract the rack bar 128 and the detent 126 and release the pawl 124 for engagement with the driving teeth. Then, as the feeler 13' moves beyond the detected stalk and the switch 31' opens, the solenoid is deenergized and the rack bar is advanced by the spring 130 to position the detent in the path of the pawl. When the cutter arm 39' completes one revolution, the detent engages the pawl to shift the latter away from the driving teeth 123 and against the stop 131 thereby stopping the arm abruptly, the dog 132 entering its notch 135 to avoid reverse rotation of the arm.

It will be apparent from the foregoing that, as the frame is advanced along and above an asparagus bed 11, the feelers 13 operate individually to detect the presence of mature stalks 10 to their respective swaths and each completes the actuating circuit of its associated cutter drive mechanism for propulsion of the cutter independently of the other cutters. Since each cutter moves longitudinally of the frame path and through its cutting position in a direction reverse to the frame movement, the cutter avoids damaging stalks in the paths of adjacent cutters as well as stalks in its own path other than the detected stalk. By locating the cutting position of each cutter above the ground, it is possible, in one continuous unidirectional motion of the cutter, not only to cut off a detected stalk, but also to retain control of the stalk and advance the same to a collection point on the frame.

This application is a continuation-in-part of my copending application Serial No. 337,948, filed February 20, 1953 and now abandoned.

I claim as my invention:

1. An asparagus harvesting machine having, in combination, a wheeled frame movable over an asparagus bed along a predetermined path, a shaft journaled on said frame for rotation about a horizontal axis, means on said frame for rotating said shaft continuously during advance of the frame, a plurality of elongated arms journaled on said shaft to turn in vertically disposed circular paths about said axis, each of said arms, when traversing its path, moving first downwardly through a depending cutting position and then upwardly to an upright stop position, means carried by each of said arms for cutting and retaining control of a stalk as the arm moves through said cutting position and to said upright position, individual means releasably holding each of said arms in said upright position thereof and operable to stop the arm abruptly when it reaches such position whereby to throw a cut-off stalk carried by said arm means away from the latter and horizontally and circumferentially away from the path of the arm, a stalk receiver on said frame extending longitudinally of and spaced horizontally from said shaft and opening toward said arm paths to receive cut-off stalks thrown circumferentially from said arms, individual sensing devices for said arms carried by said frame and each operable, during advance of the latter along its path, to detect the presence of a mature stalk in the frame path ahead of said cutting positions of the associated arm, normally disengaged individual couplings between said shaft and each of said arms, and mechanism associated with said couplings and said individual holding means and operated in timed relation to the detection of a stalk by each of said sensing devices first to release the holding means and engage the coupling of the associated arm to propel the arm through its cutting position at the time when the stalk sensed by the device is in the same position and, after movement of the arm out of its inactive position, to disengage the coupling and activate the holding means to stop the arm in said upright position.

2. In an asparagus harvesting machine having, in combination, a wheeled frame movable over an asparagus bed along a predetermined path, a plurality of elongated arms arranged in a row across said frame and each journaled on the latter to turn in a vertically disposed circular path about a horizontal axis extending transversely of the frame, each of said arms, when traversing its path, moving first forwardly of the frame and downwardly through a depending cutting position and then rearwardly and upwardly to an upright stop position, means carried by each of said arms for cutting and retaining control of a stalk as the arm moves through said cutting position and to said upright position, individual means releasably holding each of said arms in said upright position thereof and operable to stop the arm abruptly when it reaches such position whereby to throw a cut-off stalk carried by the arm forwardly from said axis thereof and along said frame, and a common receiver for all of said arms mounted on said frame forwardly of the arms and extending transversely of the frame to receive each cut-off stalk as the latter is thrown forwardly from the arm carrying the stalk.

3. An asparagus harvesting machine having, in combination, a wheeled frame movable over an asparagus bed along a predetermined path, a plurality of first sensing devices mounted on said frame in a row extending transversely of said path and each operable, during advance of the frame along said path, to detect the presence of mature stalks of asparagus in a swath extending longitudinally of the path and parallel to the swaths of the other devices, a plurality of second sensing devices similar to said first devices mounted on said frame in a row extending transversely of the frame behind said first row and each operable, during advance of the frame along said path, to detect the presence of mature stalks of asparagus in a swath extending longitudinally of the frame and intervening between and overlapping adjacent swaths of the first sensing devices, a plurality of cutters one associated with each of said sensing devices and each mounted on said frame behind the row of its associated device for movement through a cutting position adjacent the lower end of a stalk and in the swath of the associated device, a plurality of power actuators corresponding to said cutters in number and mounted on said frame with one connected to each cutter and the associated sensing device for operation in timed relation to detection of a stalk by the associated sensing device to move the associated cutter from its inactive position and into its cutting position at the time when the stalk sensed by said device is in the same position.

4. An asparagus harvesting machine having, in combination, a wheeled frame movable over an asparagus bed along a predetermined path, an elongated arm journaled on said frame to turn in a vertically disposed circular path about a horizontal axis extending transversely of the frame, said arm, when traversing its path, moving first forwardly of the frame and downwardly through a depending cutting position and then rearwardly and upwardly to an upright stop position, a cutter carried by said arm adjacent the outer end thereof and disposed above the ground in said cutting position, a holder carried by said arm and opening forwardly along said path thereof to receive and retain stalks cut by said cutter, means mounted on said frame and connected to said arm for releasably holding the arm in said upright position and stopping the arm abruptly when it reaches such position whereby to throw a cut-off stalk carried by said holder forwardly from said axis and along said frame, a receiver mounted on said frame forwardly of said axis to receive each cut-off stalk as the latter is thrown forwardly from said holder, a sensing device carried by said frame and operable, during advance of the latter along its path, to detect the presence of a stalk in the frame path ahead of said cutting position, and power actuated mechanism mounted on said frame and connected to said sensing device, said arm and said holding means for operation in timed relation to the detection of a stalk by said sensing device to release the holding means and propel said arm first forwardly and downwardly through said cutting position at the time when the stalk sensed by the device is in the same position relative to said frame and then rearwardly and upwardly to said upright position.

5. An asparagus harvesting machine having, in combination, a frame supported on wheels for movement above an asparagus bed and along a predetermined path, a horizontal shaft journaled on said frame and connected to said wheels for rotation of the shaft during advance of said frame along said path and at a speed proportional to the rate of advance of the frame, an elongated arm journaled on said shaft to turn in a vertically disposed circular path, said arm, when traversing its path, moving first downwardly through a depending cutting position and then upwardly to an upright stop position, means carried by said arm for cutting and retaining control of a stalk as the arm moves through said cutting position and to said upright position, a sensing device carried by said frame and operable, during advance of the latter along its path, to detect the presence of a mature stalk in the frame path ahead of said cutting position, and mechanism associated with said device and operable in timed relation to detection of a stalk thereby to couple said arm to said shaft to propel the arm through said cutting position when a stalk detected by the device is in the same position and, after movement of the arm through the cutting position, to stop the arm abruptly and releasably hold the same in said inactive position.

6. An asparagus harvesting machine having, in combination, a wheeled frame movable over an asparagus bed along a predetermined path, a cutter, an arm supporting said cutter and journaled on said frame to carry the cutter unidirectionally from an inactive position above the top of mature stalks in said bed downwardly to a cutting position adjacent the lower end of a stalk and then upwardly to the inactive position, an electromagnetic friction brake acting between said frame and said arm and operable, when energized, to stop said arm and releasably hold the same in said inactive position, a sensing device carried by said frame and operable during advance of the latter along said frame path, to detect the presence of a mature stalk in the path ahead of said cutting position, a locating block mounted on said frame adjacent said inactive position and movable back and forth between a retracted position out of the path of said arm and an advanced position of abutment with a leading surface of the arm when the latter is in its inactive position, and mechanism associated with said brake and said block and operated in timed relation to detection of a stalk by said sensing device to deenergize the brake and retract the block to permit rotation of said arm from said inactive position and through said cutting position at the time when the stalk sensed by the device is in the same position and to energize the brake and advance said block to stop the arm precisely in said inactive position after the arm has moved through its cutting position.

7. An asparagus harvesting machine having, in combination, a wheeled frame movable over an asparagus bed along a predetermined path, a shaft journaled on said frame to turn about a horizontal axis, means on said frame for rotating said shaft continuously during advance of the frame, a cutter, an arm supporting said cutter and journaled on said shaft to carry the cutter from an inactive position above the shaft downwardly to a cutting position below the shaft and then upwardly to the inactive position, an electromagnetic friction brake acting between said frame and said arm and operable, when energized, to stop said arm and releasably hold the same in said inactive position, a clutch acting between said arm and said shaft, a sensing device carried by said frame and operable during advance of the latter along said path, to detect the presence of a mature stalk in the path ahead of said cutting position, and mechanism associated with said clutch and brake and operated in timed relation to detection of a stalk by said sensing device first to deenergize said brake and engage said clutch to propel said arm from said inactive position and through said cutting position at the time when the stalk sensed by the device is in the same position and then to disengage the clutch and energize the brake to stop the arm abruptly in said inactive position.

8. An asparagus harvesting machine having, in combination, a wheeled frame movable over an asparagus bed along a predetermined path, a shaft journaled on said frame for rotation about a horizontal axis, means on said frame for rotating said shaft continuously during advance of the frame, a cutter, an arm supporting said cutter and journaled on said shaft for turning about said axis to move said cutter from an inactive position above the tops of mature stalks in said bed downwardly to a cutting position below the shaft and adjacent the lower end of a stalk and then upwardly to a discharge position, a clutch having normally disengaged driving and driven elements carried by said shaft and said arm, a sensing device carried by said frame and operable, during advance of the latter along said path, to detect the presence of a mature stalk along the path ahead of said cutting position, and activating mechanism for said clutch including an electromagnet and operating in timed relation to detection of a stalk by said sensing device to engage said clutch elements to propel said cutter through said cutting position at the time when the stalk sensed by the device is in the same position and continue the movement of the cutter to said discharge position, said arm having a surface engageable with the cut-off stalk to support the same for transfer with the cutter to said discharge position.

9. An asparagus harvesting machine having, in combination, a wheeled frame movable over an asparagus bed along a predetermined path, a horizontal shaft journaled on said frame, means on said frame for rotating said shaft continuously during advance of the frame, an arm journaled on said shaft to turn in a vertically disposed circular path about the shaft, said arm, when traversing its path, moving first downwardly through a depending cutting position and then upwardly to an upright stop position above the tops of mature stalks in said bed, means carried by said arm for cutting and retaining control of a stalk as the arm moves through said cutting position and to said upright position, a sensing device carried by said frame and operable, during advance of the latter along its path, to detect the presence of a mature stalk in the frame path ahead of said cutting position, and mechanism including a normally disengaged coupling between said arm and said shaft and operated in timed relation to the detection of a stalk by said sensing device first to engage the coupling to propel said arm through said cutting position at the time when the stalk sensed by the device is in the same position and, after movement of the arm beyond the cutting position, to stop the arm in said upright position.

10. An asparagus harvesting machine having, in combination, a wheeled frame movable over an asparagus bed along a predetermined path, an elongated arm journaled on said frame to turn in a vertically disposed circular path about a horizontal axis, said arm, when traversing its path, moving first downwardly through a depending cutting position and then upwardly to an upright stop position, a cutter carried on said arm adjacent the outer end thereof and disposed above the ground in said cutting position, a holder carried by said arm and opening forwardly along said arm path thereof to receive and retain stalks cut by said cutter, means mounted on said frame and connected to said arm for releasably holding the arm in said upright position and stopping the arm abruptly when it reaches such position whereby to throw a cut-off stalk carried by said holder away from said holder and circumferentially of said arm path, a receiver on said frame spaced horizontally from said axis and beyond said arm path to receive each cut-off stalk as the latter is thrown from said holder, a sensing device carried by said frame and operable, during advance of the latter along its path, to detect the presence of a mature stalk in the frame path ahead of said cutting position, a power actuator for said cutter arm mounted on said frame and connected to the arm for propelling the same along said arm path when the actuator is rendered effective, and mechanism mounted on said frame and connected to said sensing device, said actuator and said holding means for operation of the latter and the actuator in timed relation to the detection of a stalk by said sensing device to release the holding means and propel said arm first through said cutting position at the time when the stalk sensed by the device is in the same position relative to said frame and then on to said upright position.

11. An asparagus harvesting machine having, in combination, a wheeled frame movable over an asparagus bed along a predetermined path, an elongated arm journaled on said frame to turn in a vertically disposed circular path about a horizontal axis, said arm, when traversing its path, moving first downwardly through a depending cutting position and then upwardly to an upright stop position, means carried by said arm for cutting and retaining control of a stalk as the arm moves through said cutting position and to said upright position, means mounted on said frame and connected to said arm for releasably holding the arm in said upright position and stopping the arm abruptly when it reaches such position whereby to throw a cut-off stalk carried by said arm means away from the latter and horizontally and circumferentially away from said arm path, a receiver on said frame spaced horizontally from said axis and beyond said arm path to receive each cut-off stalk as the latter is thrown away from said arm means, a sensing device carried by said frame and operable, during advance of the latter along its path, to detect the presence of a mature stalk in the frame path ahead of said cutting position, a power actuator for said cutter arm mounted on said frame and connected to the arm to propel the same along said arm path when the actuator is rendered effective, and mechanism mounted on said frame and connected to said sensing device, said actuator and said holding means for operation of the actuator and the holding means in timed relation to the detection of a stalk by said sensing device to release the holding means and propel said arm first through said cutting position at the time when the stalk sensed by the device is in the same position relative to said frame and then on to said upright position.

12. An asparagus harvesting machine having, in combination, a wheeled frame movable over an asparagus bed along a predetermined path, a cutter, an elongated arm supporting said cutter and journaled on said frame to turn in a vertically disposed circular path about a horizontal axis extending transversely of the frame, said arm, when traversing its path, carrying said cutter first forwardly of the frame, then downwardly and rearwardly through a depending cutting position, and finally upwardly to an upright stop position, a sensing device carried by said frame and operable, during advance of the latter along said frame path, to detect the presence of a mature stalk in the frame path ahead of said cutting position, and power actuated mechanism for said cutter mounted on said frame and operated in timed relation to detection of a stalk by said device to propel the arm from said stop position and through said cutting position at the time when the stalk sensed by the device is in the same position, said cutter, when moving through said cutting position, traveling relative to said bed in a loop elongated in a vertical direction and narrowed in a horizontal direction.

13. An asparagus harvesting machine having, in combination, a frame supported on wheels for movement in a predetermined path along and above an asparagus bed, a cutter and a support therefor mounted on said frame for unidirectional movement in an arcuate path from an inactive position above the tops of mature stalks in said bed first downwardly to a cutting position above the ground and adjacent the lower end of a stalk and then upwardly to a discharge position, a sensing device carried by said frame and operable, during advance of the frame along said frame path, to detect the presence of a mature stalk in the frame path ahead of said cutting position, and power actuated mechanism for said cutter mounted on said frame and operable in timed relation to detection of a stalk by said device and advance of the frame to move the cutter continuously and in the same direction from said inactive position to said discharge position and through said cutting position at the time when the stalk sensed by the device is in the cutting position, said support having a surface thereon engageable with the cut-off stalk to support the same during transfer thereof to said discharge station.

14. An asparagus harvesting machine having, in combination, a wheeled frame movable over an asparagus bed along a predetermined path, a feeler depending from said frame for engagement with and movement by the top of a mature stalk of asparagus beneath the frame, a cutter and a support therefor mounted on said frame for movement longitudinally of said frame path and unidirectionally from a normally inactive position above the tops of mature stalks downwardly to a cutting position adjacent the lower end of a stalk and above the ground and then upwardly to a stalk discharge position, and power actuated mechanism mounted on said frame and connected to said support and said feeler for operation in timed relation to movement of the feeler upon engagement of the same with a stalk to move said cutter to said cutting position at the time when the stalk sensed by said feeler is in the same position relative to the frame, said cutter support having a surface engageable with the cut-off stalk and supporting the stalk during the transfer thereof to said discharge position in the continued movement of the cutter beyond said cutting position.

15. An asparagus harvesting machine having, in combination, a wheeled frame movable along a predetermined path above an asparagus bed, a cutter and a support therefor mounted on said frame for movement relative to the frame first longitudinally of said path and downwardly from an inactive position above the tops of mature stalks in said bed to a cutting position adjacent the lower end of a stalk and then upwardly to a discharge position, a sensing device carried by said frame and operable, during advance of the frame along said path, to detect the presence of a mature stalk of predetermined height ahead of said cutting position in said path, power actuated mechanism for said cutter mounted on said frame and operated in timed relation to the detection of a stalk by said device and advance of the frame to move said cutter first out of said inactive position and into said cutting position at the time when the stalk sensed by the device is in the cutting position and then into said discharge position, and a member carried by said support engageable with the cut-off stalk to transfer the same from said cutting position to said discharge position.

No references cited.